(12) United States Patent
Doege et al.

(10) Patent No.: US 6,743,361 B1
(45) Date of Patent: Jun. 1, 2004

(54) METHOD FOR BACTERIALLY TREATING TANK TOILET SYSTEMS AND APPARATUS FOR USING SAME

(75) Inventors: Brian Doege, Austin, TX (US); Saul Krell, Houston, TX (US); Mark Brodowicz, Indianapolis, IN (US); Michael Cooney, Greenwood, IN (US)

(73) Assignee: Biological Systems, Inc., Austin, TX (US)

( * ) Notice: Subject to any disclaimer, the term of this patent is extended or adjusted under 35 U.S.C. 154(b) by 0 days.

(21) Appl. No.: 09/723,549

(22) Filed: Nov. 27, 2000

(51) Int. Cl.$^7$ .................................................. C02F 3/00
(52) U.S. Cl. ..................... 210/605; 210/606; 210/610; 210/617; 210/622; 210/631; 210/916
(58) Field of Search ...................... 210/605, 606, 210/610, 617, 622, 631, 916

(56) References Cited

U.S. PATENT DOCUMENTS

| | | | |
|---|---|---|---|
| 3,067,433 A | 12/1962 | Dietz et al. ........................ 4/78 |
| 3,356,221 A | 12/1967 | Katona et al. ............... 210/360 |
| 3,473,171 A | 10/1969 | Palmer .......................... 4/78 |
| 3,567,032 A | 3/1971 | Kemper | |
| 3,662,888 A | 5/1972 | Kemper ...................... 210/167 |
| 3,666,106 A * | 5/1972 | Green .......................... 210/201 |
| 3,720,606 A * | 3/1973 | Horney et al. .................. 422/5 |
| 3,824,632 A | 7/1974 | Bach et al. | |
| 3,873,445 A * | 3/1975 | Bussard ....................... 210/149 |
| 3,927,200 A * | 12/1975 | Yoshimura et al. ............ 424/50 |
| 3,950,249 A * | 4/1976 | Eger et al. ................... 210/104 |
| 3,990,967 A * | 11/1976 | Hargraves .................... 210/194 |
| 4,032,995 A * | 7/1977 | Kemper .......................... 4/319 |
| 4,063,315 A * | 12/1977 | Carolan et al. ................. 4/216 |
| 4,218,233 A * | 8/1980 | Hackett ....................... 504/102 |
| 4,292,285 A * | 9/1981 | Nakao et al. ................ 252/190 |
| 4,313,233 A * | 2/1982 | Roberts .......................... 4/321 |
| 4,346,002 A * | 8/1982 | Petzinger ..................... 210/202 |
| 4,655,794 A * | 4/1987 | Richardson et al. | |
| 4,793,386 A * | 12/1988 | Sloan .......................... 137/351 |
| 5,221,466 A * | 6/1993 | Garcia et al. ............... 209/166 |
| 5,275,943 A * | 1/1994 | DiTuro ........................ 210/601 |
| 5,346,245 A * | 9/1994 | Budrow et al. ............. 220/757 |
| 5,397,699 A * | 3/1995 | Davis et al. .................... 435/6 |
| 5,449,619 A * | 9/1995 | Griffin et al. ............... 210/601 |
| 5,450,634 A * | 9/1995 | Mohrman ....................... 4/326 |
| 5,464,766 A | 11/1995 | Bruno | |
| 5,543,309 A | 8/1996 | Pischel | |
| 5,645,725 A * | 7/1997 | Zitzelsberger et al. ....... 210/605 |
| 5,709,872 A * | 1/1998 | Van Rees .................... 424/420 |
| 5,736,049 A * | 4/1998 | Bundy et al. ................ 210/170 |
| 5,863,882 A * | 1/1999 | Lin et al. ..................... 510/397 |

(List continued on next page.)

FOREIGN PATENT DOCUMENTS

| | | |
|---|---|---|
| GB | 2324083 A | 10/1998 |
| JP | 62-166878 | * 7/1987 |

OTHER PUBLICATIONS

Kadden, J., "Learning to Wait Until You Get Home," New York Times, Jun. 8, 2003, sec. 14CN, p 1, col 2 (also http://www.lirrcommuters.org/LIRR/LIRRCCDisc.nsf/0/ece31eb5e953046a85256d4300639891?OpenDocument, Jun. 12, 2003).*

(List continued on next page.)

*Primary Examiner*—Chestert Barry
(74) *Attorney, Agent, or Firm*—Ross Spencer Garsson Winstead Sechrest & Minick P.C.

(57) ABSTRACT

The present invention relates in general to a method for bacterially treating small-tank toilet systems and an apparatus for using same, and in particular, bacterially treating small-tank portable toilets, such as toilet systems in airplanes, busses, campers, trains, boats, and free-standing portable toilets.

25 Claims, 11 Drawing Sheets

U.S. PATENT DOCUMENTS

| | | | | |
|---|---|---|---|---|
| 5,891,330 | A | * | 4/1999 | Morris ........................ 210/104 |
| 5,928,514 | A | * | 7/1999 | Gothreaux ................... 210/617 |
| 5,956,780 | A | * | 9/1999 | Tyler .............................. 4/321 |
| 6,066,293 | A | | 5/2000 | Van Rees ....................... 422/5 |
| 6,069,004 | A | * | 5/2000 | Teramachi et al. ........ 435/292.1 |
| 6,143,185 | A | * | 11/2000 | Tracy et al. ................. 210/744 |
| 6,223,361 | B1 | * | 5/2001 | Rozenblatt ..................... 4/321 |
| 6,225,362 | B1 | * | 5/2001 | Cox ............................... 252/2 |
| 6,245,552 | B1 | * | 6/2001 | Glendening et al. ........ 210/606 |
| 6,245,556 | B1 | * | 6/2001 | Sako et al. .................. 422/171 |
| 6,325,934 | B1 | * | 12/2001 | Tobey et al. ................ 210/606 |
| 6,344,141 | B1 | * | 2/2002 | Vandenbergh et al. ...... 210/611 |
| 6,376,451 | B1 | * | 4/2002 | Teasdale et al. ............ 435/188 |
| 6,399,056 | B1 | * | 6/2002 | Ono et al. ................... 424/520 |
| 6,406,669 | B1 | * | 6/2002 | Duan et al. .............. 422/82.09 |

OTHER PUBLICATIONS

Bird, et al., "Transport Phenomena," Sec. 4.4,"Boundary–Layer Theory," pp.140–146, John Wiley & Sons, 1960.* http://newsignal.com/ (undated) (last modified Oct. 8, 2001) downloaded by the examiner on Jan. 11, 2002.* http://www.tomah3.com/Documents/P–06e.pdf dated May 6, 1996 downloaded Jan. 11, 2002).* http://www.gsc.state.tx.us/spec_lib/180apltable.html.* http://www.airporducts.com/Surfynol/pdf2/bio_toxinfo.pdf.* http://www.dow.com/versene/prod.htm.* http://www.railroadpix.com/rrphotos/detail/418.html.* http://www.railnews.com/NEWS/IN/020211amtrak.htm.*

Biological Systems Inc., Background Summary regarding Company and Products, Copyright 2000, 2 pages.

Biological Systems, Inc., *Trap Master BMTB–2010. Bio-–Sys Microbial Trap Block for Grease Trap and Lift Station Treatments,* Copyright 2000, 2 pages.

Biological Systems, Inc., *BMTC–7/BMTT–2010, Bio–Sys Microbial Tank Center,* Copyright 2000, 2 pages.

Biological Systems, Inc., *Standard Grease Trap Microbe or Enzyme Treatment,* last revised 1999, 1 page.

Biological Systems, Inc., Technical Applications, *BMET–1, Trap Treatment Block, BMTB–2010 Restaurant Block, Continuous Grease Trap/Interceptor Treatment,* Last revised Jun. 18, 2001. pp. 37–48.

Fukusuke Kogyo KK; Toilet; Patent Abstracts of Japan, vol. 1997, No. 02; Feb. 28, 1997 and JP 08 260540 A, Oct. 8, 1996.

Sayama Yuichi; Method for Deodorizing Household Domestic Waste–Water Treatment Tank for Flush Toilet and Deodorizing Device Used Therefore; Patent Abstracts of Japan, vol. 1998, No. 5; Apr. 30, 1998 and JP 10 008525 A, Jan. 13, 1998.

* cited by examiner

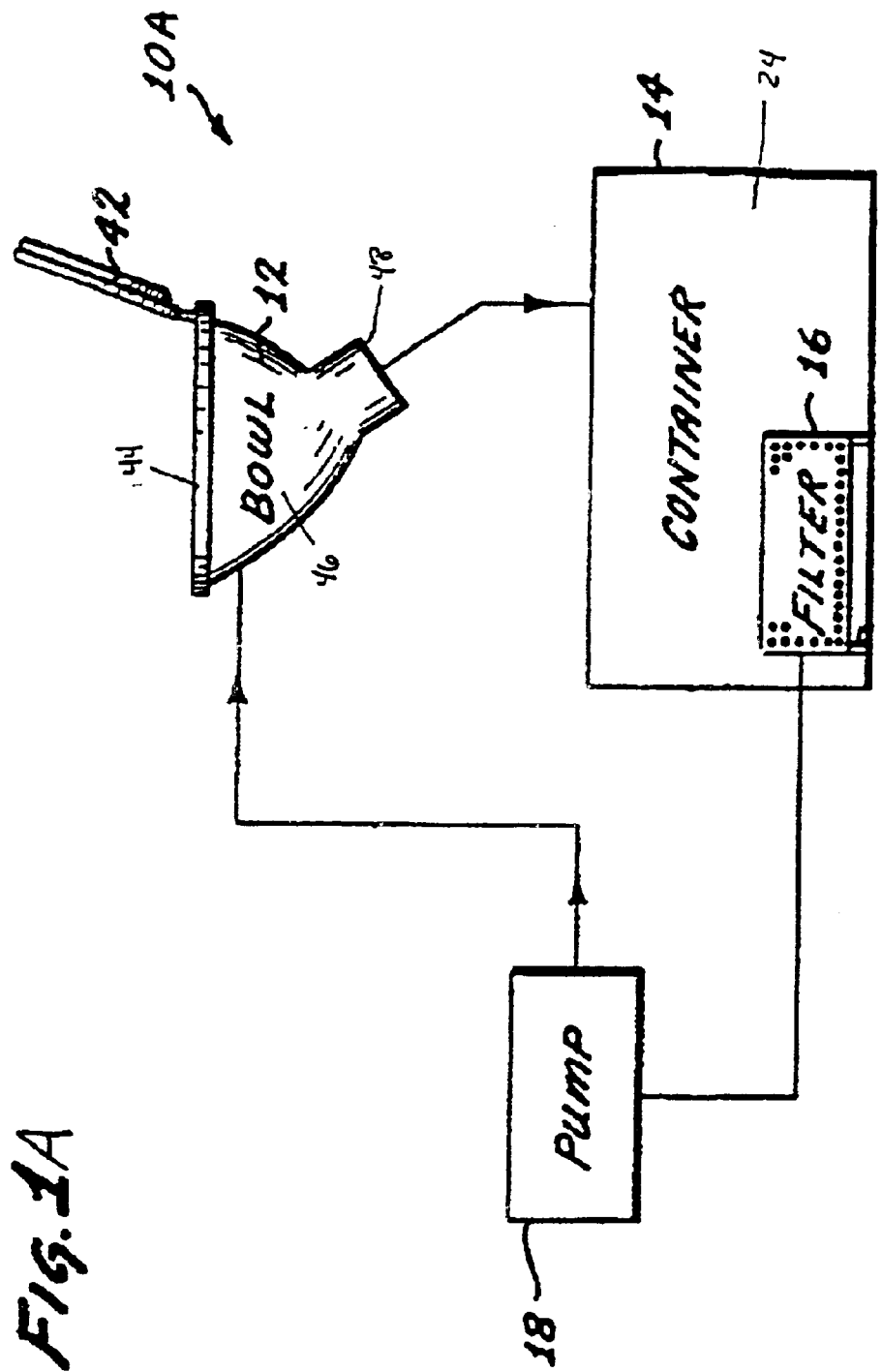

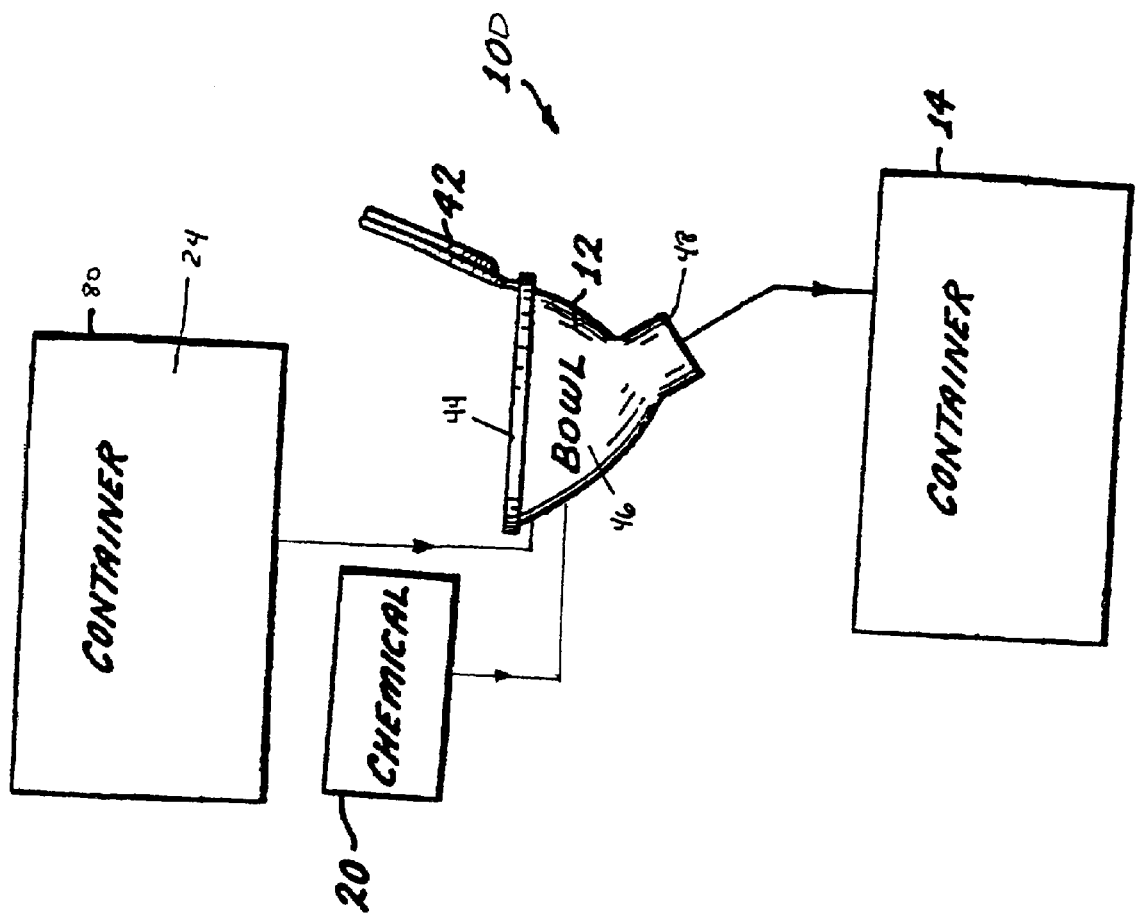

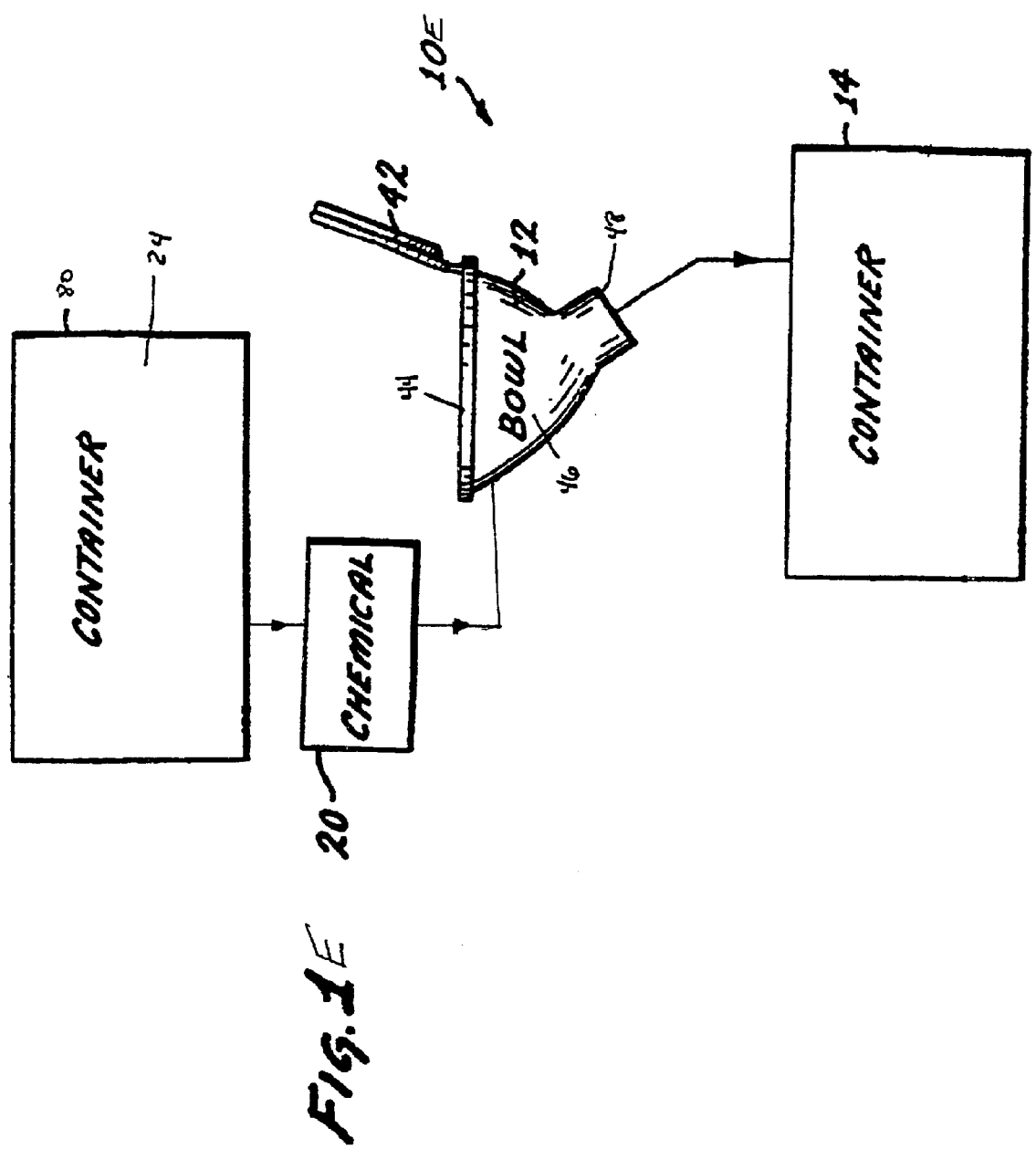

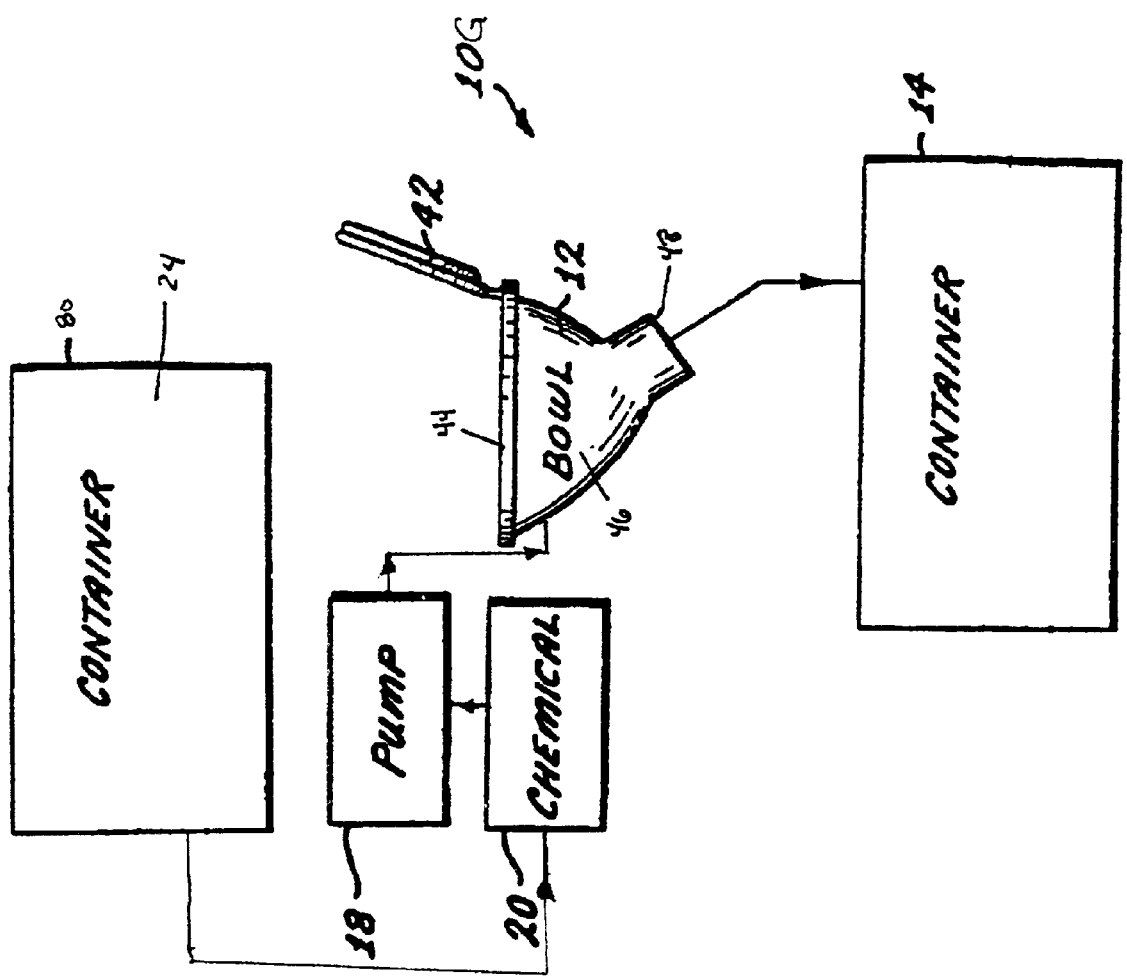

METHOD FOR BACTERIALLY TREATING TANK TOILET SYSTEMS AND APPARATUS FOR USING SAME

TECHNICAL FIELD

The present invention relates in general to a method for bacterially treating small-tank toilet systems and an apparatus for using same, and in particular, bacterially treating small-tank portable toilets, such as toilet systems in airplanes, busses, campers, trains, boats, and free-standing portable toilets.

BACKGROUND INFORMATION

On airplanes, busses, campers, trains, boats, small-tank toilet systems are often utilized. Such systems are also used in other portable systems, such as free-standing portable toilets (such as PORTA POTTI® toilet systems), that can be located in a stationary place for periods of time. Typical toilet systems have been described in U.S. Pat. No. 3,067,433 to Dietz et al.; U.S. Pat. No. 3,356,221 to Katona et al.; U.S. Pat. No. 3,473,171 to Palmer; and U.S. Pat. Nos. 3,567,032 and 3,662,888 to Kemper, all of which are incorporated herein by reference.

Although, it may be larger, a small tank is generally a tank that holds approximately 35–40 gallons of fluid or less. A large tank is generally a tank that holds approximately around 120 gallons of fluid. The use of small-tank toilet systems creates several problems unique from those of large-tank toilet systems and other toilet systems.

For instance, in small-tank toilet systems, the flushing fluid may be held or recirculated for a period of time; subsequently, the flushing fluids, including all materials collected in the system (i.e. the human waste products), are periodically drained from the system. Thereafter, the system is recharged with fresh flushing fluid.

In the prior art small-tank toilet systems, recirculation of the flushing fluid often requires the flushing fluid be deodorized and/or disinfected. For instance, formaldehyde and glutaraldehyde have been used to disinfect flushing fluid. However, because of environmental concerns about the use of volatile organic compounds (VOCs), government regulations are increasingly restricting use of formaldehyde and glutaraldehyde.

Various attempts have been made to find alternative treatments for flushing fluids. Quaternary amines exhibit some anti-microbial action and, thus, have some ability to prevent the development of odors in the fluid, but are very irritating to the skin. Moreover, many of these compounds are corrosive, and their use in closed toilet systems, including small-tank toilet systems, is prohibited by many companies.

U.S. Pat. Nos. 5,709,872 and 6,066,293 to Van Rees discloses a toilet flushing fluid made with phospholipids, and in particular synthetic phospholipids. This system employs the toilet flushing fluid with a concentration of phospholipid effective to prevent the odors from developing in the fluid by killing bacteria in the fluid or at least inhibiting the propagation of bacteria in the fluid. The flushing fluid of this system may also contain a deodorant or scent to mask whatever odors do develop in the flushing fluid.

The deodorizing or scenting the fluid and/or using anti-bacterial materials does not permanently eliminate the components collected in the system, particularly the grease molecules that are collected and built up through the use of the system. Rather, the prior art systems utilize solvents, emulsifiers, and degreasers that sever the bonds of the individual grease molecules so that these molecules become suspended in the cleaning solution. This means that the individual molecules remain intact; thus, they will later reatnach themselves to other suspended grease molecules once the cleaning solution becomes less effective (such as through dilution or cooling). It is for this reason that flushing fluids from this system cannot be readily disposed by merely injecting the discharged fluids into standard sanitation sewage systems. Typically, the sewage systems have strict regulations that prohibit the discharge of such fluids into their systems and, if they do accept such fluids, these systems typically add or charge high disposal fees to accept this waste. This is because the grease in the systems will recombine downstream and cause further problems in the sewage process. Also the anti-bactericide used in the prior art systems could seriously upset the function of the municipal sanitation systems.

The prior art has also used enzymes that do more than solvents, emulsifiers, and degreasers, in that that the bonds between the glycerol and fatty acids are broken, which makes the components of the grease molecules soluble in water. However, this still does not completely solve the problem in that the grease molecules will again combine downstream to make the complete molecular structures.

Accordingly, there is a need for a small-tank toilet system that cleans the flushing fluid in a manner such that the grease molecules from the human waste products are destroyed, rather than relocated to another place in which the problem continues to exist.

Moreover, the prior art uses deodorant or scent to mask the odors that develop in the flushing fluid. Masking the odors does not rid the odors that develop in the flushing fluid, they merely attempt to overwhelm them. Generally, as more and more human waste products are collected in the system during a period, the masking properties of the deodorant or scent become less effective. This is particularly important in small-tank toilet systems because they are contained in small confined areas. Accordingly, there is further the need to create a small-tank toilet system that substantially eliminates the odors and not merely mask them.

Another problem in the prior art particular to the small-tank toilet systems is that the collection of grease and other materials generally can effect the color of the flushing fluid in the system. Accordingly, there is further the need to create a small-tank toilet system that has a flushing fluid that retains its color throughout its use.

Another problem is that small-tank toilet systems must utilize chemicals that are safe for human contact and do not corrode the fixtures of the system. According, there is further the need to create a small-tank toilet system that is safe for human contact and will not corrode the system's fixtures.

These and other features and advantages will be in part apparent, and in part pointed out hereinafter.

SUMMARY OF THE INVENTION

An improved process for treating a small-tank toilet system has been discovered in which a commercial bacterial agent bacteria, such as *Bacillus licheniformis, Pseudomonas florescens, Alcaligenes latus, Bacillus subtilis*, and *Pseudomonas putida*, is used in combination with a surfactant. Unlike the prior art that uses anti-bacterial agents, the improved process severs the components of the grease molecules in the human waste products and breaks them into smaller sizes such that the enzymes produced by their bacteria can break down the grease molecules so that the bacteria can absorb the carbon atoms, which is the bacteria's basic food source. The results of this destruction of the grease molecules break down the molecules, which then recombines as the simple byproducts: carbon dioxide, water soluble fatty acids, and water.

Since the grease molecules are destroyed, they each cannot recombine downstream. Because of this result, the resulting flushing fluid is more readily disposable since the resulting flushing fluid has sufficient qualities that allows it to be accepted in standard sewage systems.

Moreover, because the grease molecules are destroyed, the odors of the material decomposition collecting in the flushing fluid are nearly, if not completely, eliminated because they are also broken down by the active bacteria. It was discovered that the bacteria used in the absence of the surfactant would dissipate the odors of the grease molecules. However, gaseous ammonia is formed, as a byproduct of the process employed by the bacteria to break down the collected grease materials. While not as prevalent in other toilet systems, such as for large-tank toilet systems, these ammonia fumes were quite pungent in the small-tank toilet systems. The use of the surfactant in combination with the bacteria had the unexpected effect of neutralizing the ammonia odor. It is believed the ammonium odors are neutralized because they are physically made more soluble in water by the presence of the surfactants. Because of these results, deodorizers and scents are not required. In the event an antiseptic odor is desired, such deodorizers and scents may optionally be used.

Furthermore, the surfactants act as a lubricant and cleaner to the parts of the system, such as the pumping mechanisms, macerators, filters, and flapper systerns. Accordingly, the flushing fluid with its collected materials do not corrode the system; and the surfactants decrease the wear on the system through this lubrication. Likewise, the elimination of the grease materials by the bacteria further diminishes the wear on the system during pumping and draining.

Furthermore, a bacterially compatible dye, such as tracer RB Blue A80-00-100, has been utilized so it can be used in combination with the flushing fluid of the present invention to keep the color of the flushing fluid in the system at a constant hue for aesthetic purposes. Accordingly, this coloring agent may optionally be utilized in the present invention.

Furthermore, the bacteria, surfactant, and other materials may be introduced into the system in a number of ways and a number of packages. These include in powder form, in liquid form, and in a solid block-tablet form package in water soluble pouches, tear strip pouches, or common paper packaging. For example, for the powder form, the materials can be (1) placed in a water-soluble package that can be simply placed into the system (such as by dispensing it into the toilet bowl or into the small-tank); and (2) placed in a tear-strip pouch or a simple paper package, which can be torn open and the product supplied manual again to this system by pouring it into the toilet bowl or into the small tank. The liquid and block tablet can equally be applied through such placement into the system.

Another type of application is the drip method whereby a reservoir of the liquid tank cleaner or powder form of the tank cleaner is applied to the tank in a measured amount with each toilet flush, such as is found in Bombardier passenger cars and monogram toilets.

BRIEF DESCRIPTION OF THE DRAWINGS

For a more complete understanding of the present invention and the advantages thereof, reference is now made to the following descriptions taken in conjunction with the accompanying drawings, in which:

FIG. 1A illustrates, in block diagram, an embodiment of the small-tank toilet system of the invention;

FIG. 1D illustrates, in block diagram, a third alternative embodiment of the small-tank toilet system of the invention;

FIG. 1E illustrates, in block diagram, a fourth alternative embodiment of the small-tank toilet system of the invention;

FIG. 1G illustrates, in block diagram, a sixth alternative embodiment of the small tank-toilet system of the invention.

DETAILED DESCRIPTION

Figure 1B:
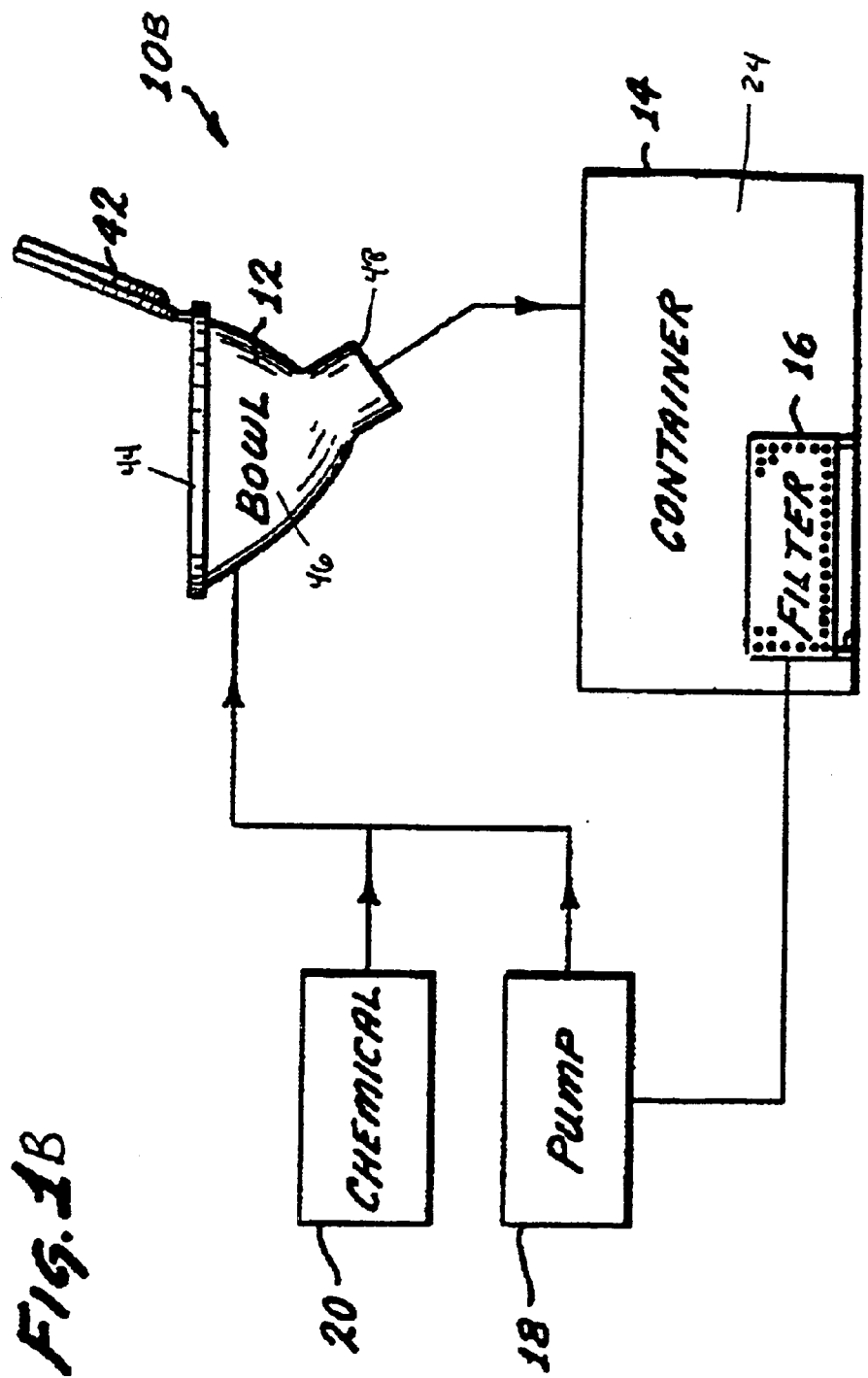
FIG. 1B illustrates, in block diagram, an alternative embodiment of the small-tank toilet system of the invention.

The present invention utilizes treating small-tank toilet systems with a combination of a bacteria, a surfactant, and, optionally, additional bacteria, surfactants, odor agents, coloring agents and other materials. Preferably, these are all premixed with one another so that the application process is simply a one step process of dispensing the completely mixed composition into the system. Besides the ease of application, the pre-mixing has the benefit of ensuring that the proportions of the constituent parts are maintained properly. Alternatively, some or all of these can be combined in the small-tank toilet system.

The bacteria/surfactant may be added in a weight ratio in the range from about 10% to about 50%, preferably from about 10% to about 30%. The bacteria used preferably include one or more of the following bacteria: *Bacillus licheniformis, Pseudomonas florescens, Alcaligenes latus, Bacillus subtilis*, and *Pseudomonas putida*. For instance, the bacteria includes the commercial available bacteria agent BMET-1, which is the bacterial component of the BMTC-2000 product sold by Applicant (Biological Systems, Inc., Austin Tex.). The bacterial formulation of BMTC-2000 is certified free of any pathological organisms and has been certified by the USDA for use as a drain cleaner in Federally regulated meat and poultry processing plants.

Surfactants used in the present invention are well known in the art and include EDTA (such as Versene 200), NP-9, F-90, Neodol 91-6, Titan TC-777, sodium 2-ethylhexyl sulfate, Surfynol 104, and DDBSA.

In a powder form, a filler, a food source, and methyl salicylate optionally may be added to the composition. Calcium carbonate may be added as the filler. (Other fillers include sodium sulfate, which may be used as the filler in the solid block-tablet form). The calcium carbonate also helps to absorb liquids to keep the powder dry. Dried brewers yeast may be added for the immediate food source of the bacteria.

Because the bacteria is stored in its solid form, it remains dormant for a long period of time. However, upon addition to water, the dried brewers yeast will allow the bacteria to feed until the toilet system is fully utilized. The methyl salicylate can be added as a type of deodorant if that is desired.

Generally, the calcium carbonate may be added in a proportion of at least about 50% by weight of the total powder, and, preferably, no more than about 80% by weight. The dried brewers yeast may be added in a range from about 0.1% to about 5% by weight, preferably in the range of about 1% to about 2% by weight. The methyl salicylate may be added in the range from about 0.05% to about 2% by weight, preferably about 0.2% to about 1% by weight. The bacteria/surfactant combination generally will be in a range from about 5% to about 50% by weight, preferably in the range from about 15% to about 20% by weight.

Moreover, a coloring agent, such as tracer RB Blue A80-00-100 or azure blue, may be added to this powder form in the range from about 1% to about 5% by weight, preferably in the range from about 3% to about 3.5% by weight. In the prior art, acid blue had typically been used; however, because it acts as a bactericide, it works against the advantages of the present invention.

For the solid block-tablet form, a binder agent, such as polyethylene glycol, can be added to the mixtures similar to the powder form. This binding agent may be added in an amount, in the range of about 0.7% to about 2.3% by weight.

For the liquid form, water is generally added to the bacteria/surfactant composition as the filler. Other fillers may include propylene glycol. Optionally, an alcohol (such as isopropanol) which increases the wetability of the liquid, and monoethanolamine may also be added. The water is at least about 50% by weight of the composition. Based upon the total weight of the alcohol, the monoethanolamine, the bacteria, and the surfactants (exclusive of the water and other fillers): (1) The alcohol may be added in the range from about 1.5% to about 60% by weight of the alcohol, the monoethanolamine, the bacteria, and the surfactants, preferably in the range from about 5% to about 20% by weight; (2) the monoethanolamine may be added in the range from about 1.5% to about 60% by weight of the alcohol, the monoethanolamine, the bacteria, and the surfactants, preferably in the range from about 5% to about 15% by weight; and (3) the bacteria/surfactant combination generally will be in the range from about 20% to about 95% by weight of the alcohol, the monoethanolamine, the bacteria, and the surfactants, preferably in the range from about 65 to about 90% by weight.

Like the powder form, a coloring agent, such as again tracer RB Blue A80-00-100 or azure blue, may be added to this liquid form in the range from about 1% to about 5% by weight, preferably in the range from about 3% to about 3.5% by weight.

The foregoing has outlined rather broadly the features and technical advantages of the present invention in order that the detailed description of the invention that follows may be better understood. Additional features and advantages of the invention will be described hereinafter which form the subject of the claims of the invention.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail. For the most part, details and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1A illustrates, in block diagram, an embodiment of the small-tank toilet system 10A. This embodiment is a typical recirculation small-tank toilet system, which comprises a bowl assembly 12, a small tank or container 14, a filter 16, and an actuator pump 18. In general, the bowl assembly 12 receives human waste products that are flushed into the container 14. The container is initially charged with a flushing fluid 24 to provide enough capacity to handle a predetermined number of uses of the system. The flushing fluid 24 is chemically treated with the bacteria/surfactant composition so that the flushing fluid 24 is a water-chemical mixture to ensure the benefits of the present invention, including sanitation. In the small-tank toilet system 10A, the chemical treatment can be performed in multiple ways, including disposing the bacteria/surfactant composition into the bowl assembly 12 and/or the container 14. The filter 16 is provided to allow the flushing fluid 24, within the container 14 to recirculate while the actuator pump 18 removes the liquid from the filter interior to cause the flushing of the waste products from the bowl assembly 12.

The bowl assembly 12 includes a cover 42, a seat 44, and a bowl 46. A chute 48 is provided at the bottom of the bowl to direct waste products to container 14.

FIG. 1B illustrates, in block diagram, an embodiment of the small-tank toilet system 10B, which is the same as FIG. 1A, except that the recirculation small-tank toilet system has a chemical reservoir 20, in which the bacteria/surfactant composition may be introduced in the same manners as in FIG. 1A plus methods utilizing the chemical reservoir 20, such as a drip method (i.e. dripping the bacteria/surfactant composition slowly into the system typically on a per flush basis).

Figure 1C:
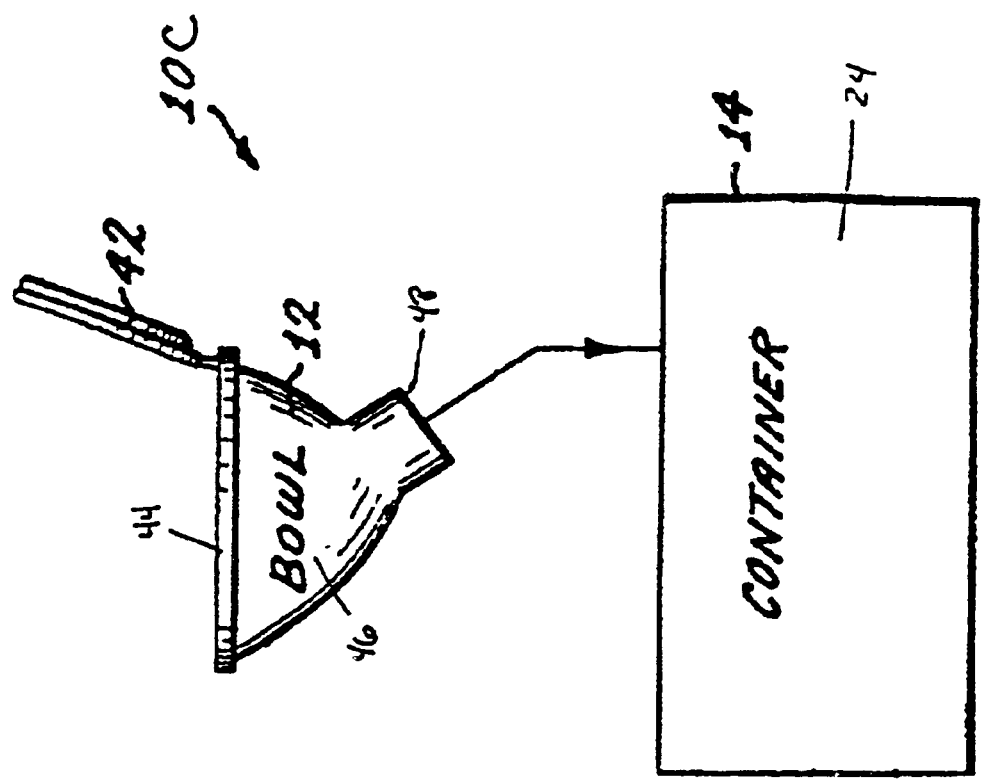
FIG. 1C illustrates, in block diagram, a second alternative embodiment of the small-tank toilet system of the invention.

FIG. 1C illustrates, in block diagram, an embodiment of the small-tank toilet system 10C, which is the same as FIG. 1A, except that in lieu of a recirculation system that includes parts filter 16, and actuator pump 18, the small-tank toilet system simply holds the fluids in container 14. This is similar to the manner a typical PORTA POTTI® toilet system is utilized. In the small-tank toilet system 10C, the chemical treatment can again be performed in multiple ways, including disposing the bacteria/surfactant composition into the bowl assembly 12 and/or the container 14.

FIG. 1D illustrates, in block diagram, an embodiment of the small-tank toilet system 10D, which is the same as FIG. 1C, except that it has a second container 80, as well as a chemical reservoir 20. The container 80 contains the clean flushing fluid 24 that is collected after use in container 14. In the small-tank toilet system 10D, the chemical treatment can be performed by flowing clean flushing fluid into the bowl assembly 12 during each flushing cycle, while dripping the chemicals from chemical reservoir 20 in a preset amount per flush.

FIG. 1E illustrates, in block diagram, an embodiment of the small-tank toilet system 10E, which is the same as FIG. 1D, except that the flushing fluid from container 80 is flowed by the chemical reservoir 20 such that the chemicals from the chemical reservoir 20 and the flushing fluid come in contact with one another before entry into the bowl assembly 12. In this way, the flushing fluid may act as a carrier for the chemicals in the chemical reservoir 20.

Figure 1F:
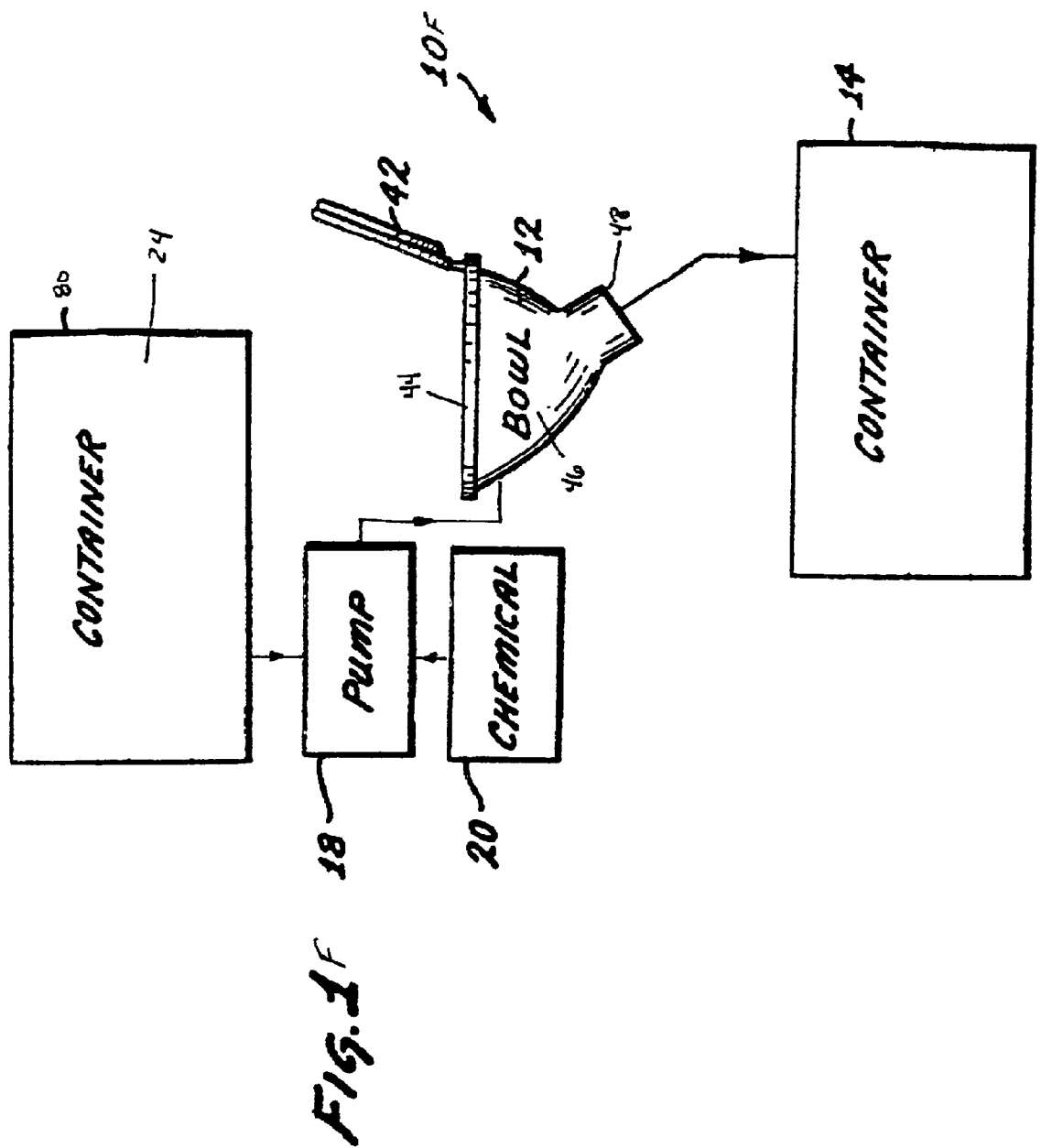
FIG. 1F illustrates, in block diagram, a fifth alternative embodiment of the small-tank-toilet system of the invention.

FIG. 1F illustrates, in block diagram, an embodiment of the small-tank toilet system 10F, which is the same as FIG. 1D, except that that an actuator pump is added to the system.

FIG. 1G illustrates, in block diagram, an embodiment of the small-tank toilet system 10G, which is the same as FIG. 1E, except that that an actuator pump is added to the system.

Figure 2:
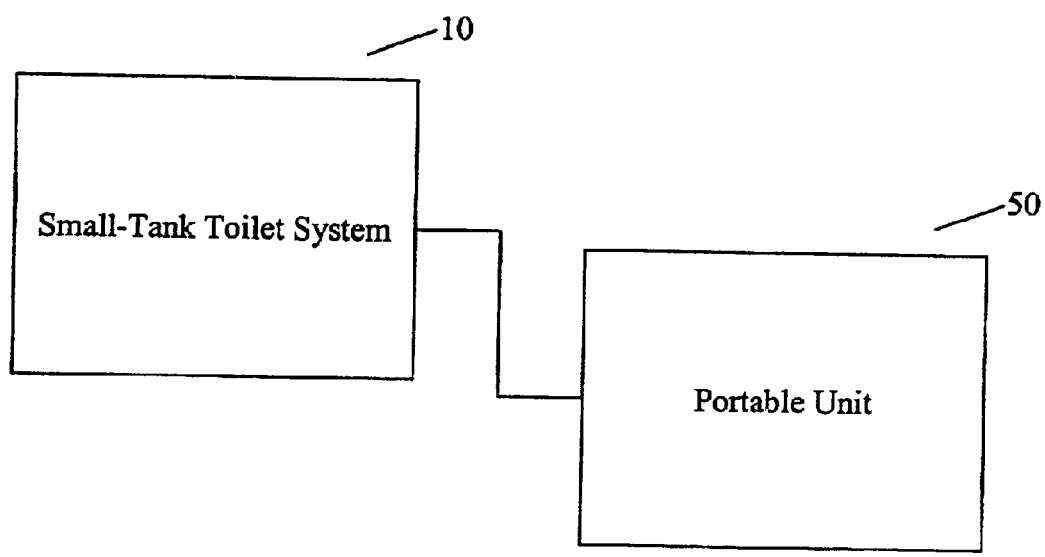
FIG. 2 illustrates, in block diagram, an embodiment of the apparatus of the invention.

FIG. 2 illustrates, in block diagram, an embodiment of the apparatus of the invention. FIG. 2 reflects that a small-tank toilet system 10 (i.e. of the alternate embodiments of FIGS. 1A, 1B, or 1C) may be used in combination with the a portable unit 50, which portable unit may be an airplane, bus, camper, train, boat, and or free-standing portable structure (such as a typical PORTA POTTI® toilet).

Figure 3A:
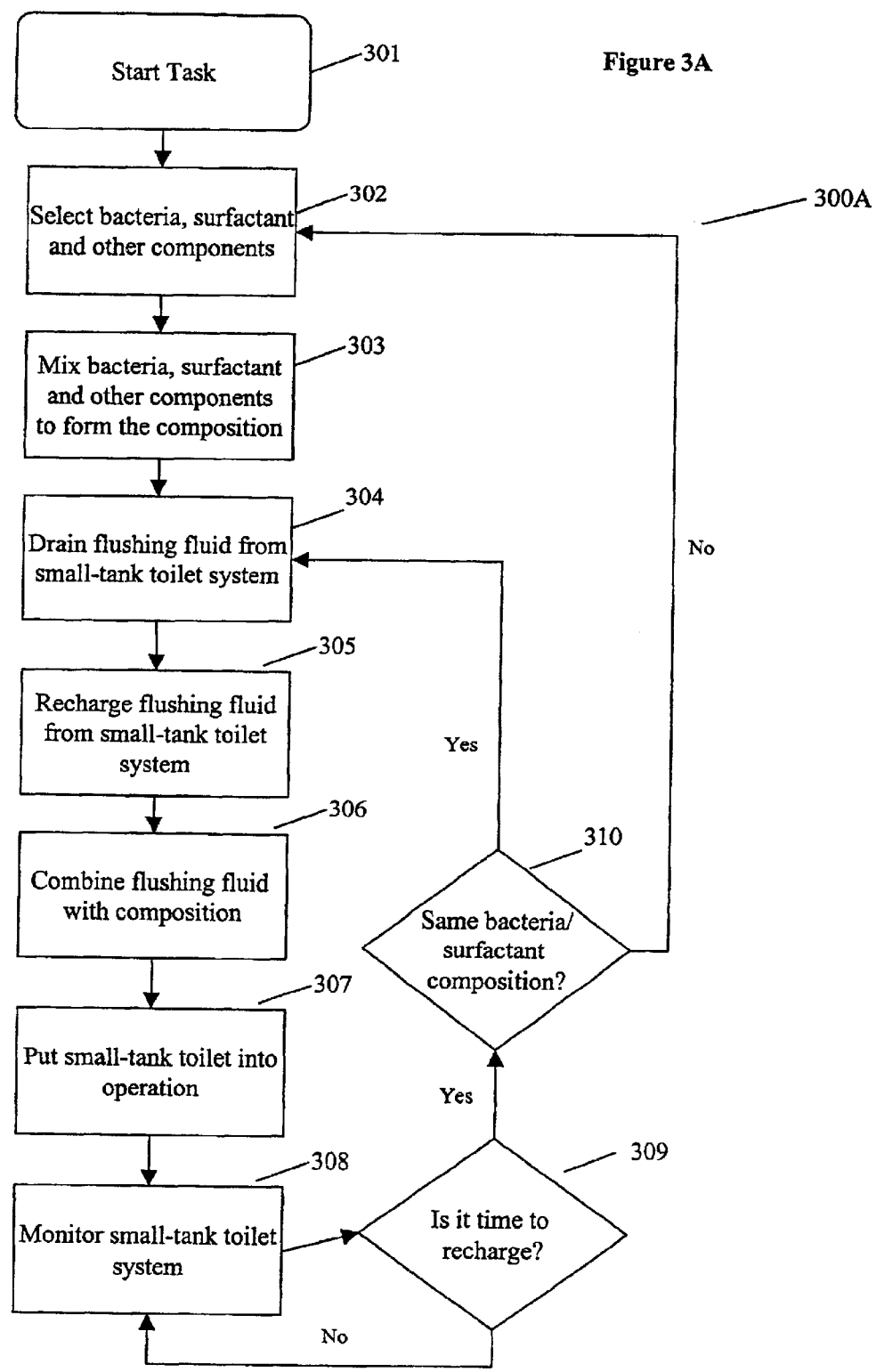
FIG. 3A illustrates, in block diagram, an embodiment of the method of the invention.

FIG. 3A illustrates, in block diagram, an embodiment of the method of the invention. The method in 300A is initiated in step 301. In step 302, the bacteria, surfactant, and other components (such as additional bacteria, surfactants, filler, food source, coloring agent, deodorizer, etc.) are selected. In step 303, these are then mixed together, such as to form a powder, a liquid, a solid block-tablet, or the like.

While this is taking place, in step 304, the small-tank toilet system is prepared by draining the flushing fluid from the system. In step 305, fresh flushing fluid is then recharged into the small-tank toilet system.

Step 306 combines the flushing fluid with the composition. This can be done, for example, in any of the matters described above for FIGS. 1A–1C.

In step 307, the small-tank toilet is put into operation, and in step 308 it is monitored. Such monitoring includes inspecting the levels of the fluids in the system to make sure it does not overflow the tank. Such monitoring may also be performed on a time basis, a per to trip basis, or some other mechanism.

In step 309, the determination is made whether the flushing fluids need to be recharged. If not, the monitoring step 308 continues. If so, in step 310, the determination is made whether the same or different bacteria/surfactant composition is to be utilized.

If the same bacteria/surfactant composition is to be utilized again, the process is returned to step 304. Otherwise, the process is returned to step 302 and a different bacteria/surfactant composition is selected.

Figure 3B:
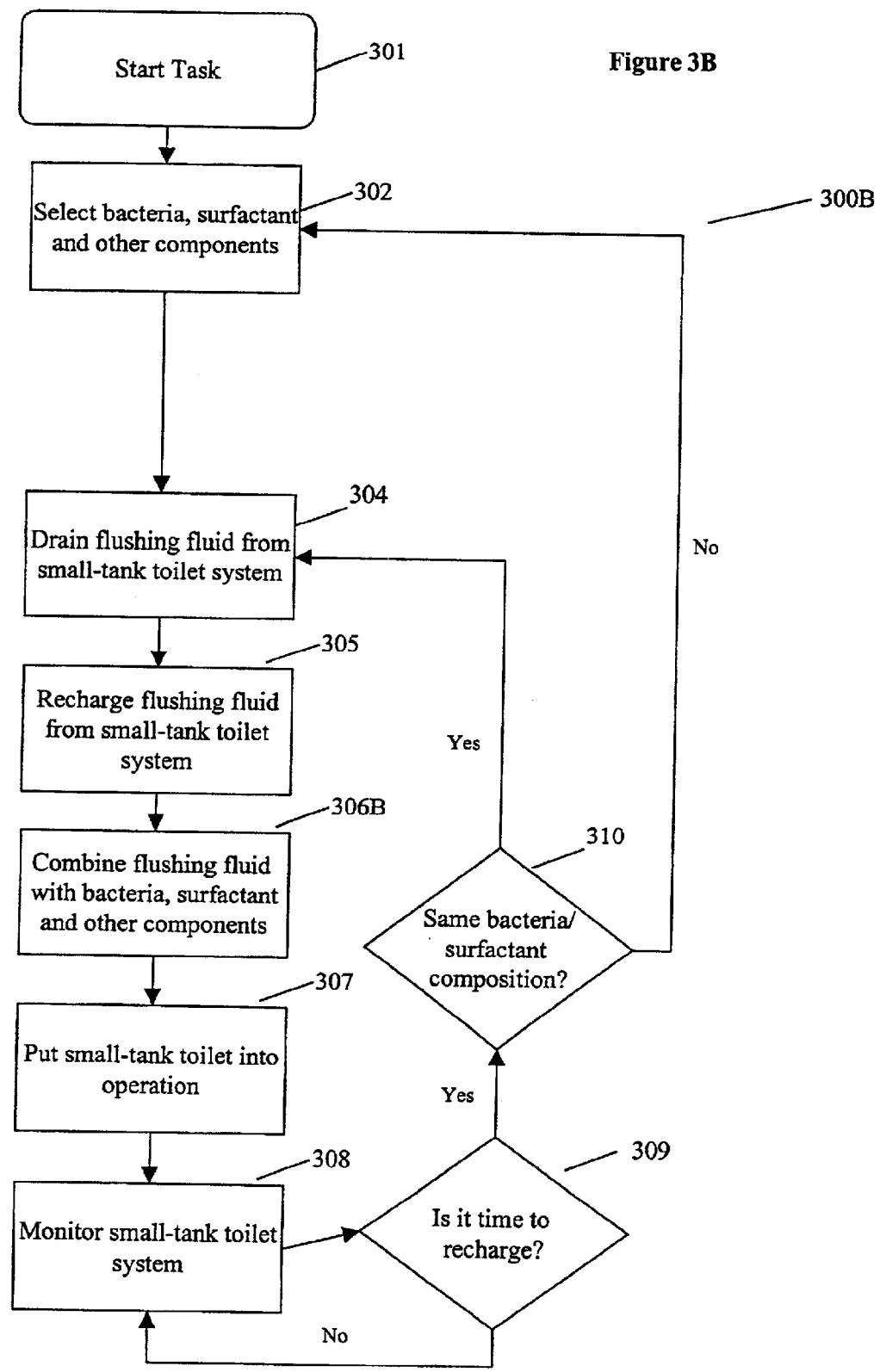
FIG. 3B illustrates, in block diagram, an alternative embodiment of the method of the invention.

FIG. 3B illustrates, in block diagram, an alternative embodiment of the method of the invention. The method in 300B is the same as the method of 300A in FIG. 3A, except for steps 303 and 306. In method 300B, step 303 is skipped. Rather in step 306B, the bacteria, surfactant, and other components selected in step 302 are combined in the flushing fluid before they are mixed together. While this process exhibits the advantages of the present invention, this process is believed to be less efficient and less reliable than the method of 300A.

Figure 3C:
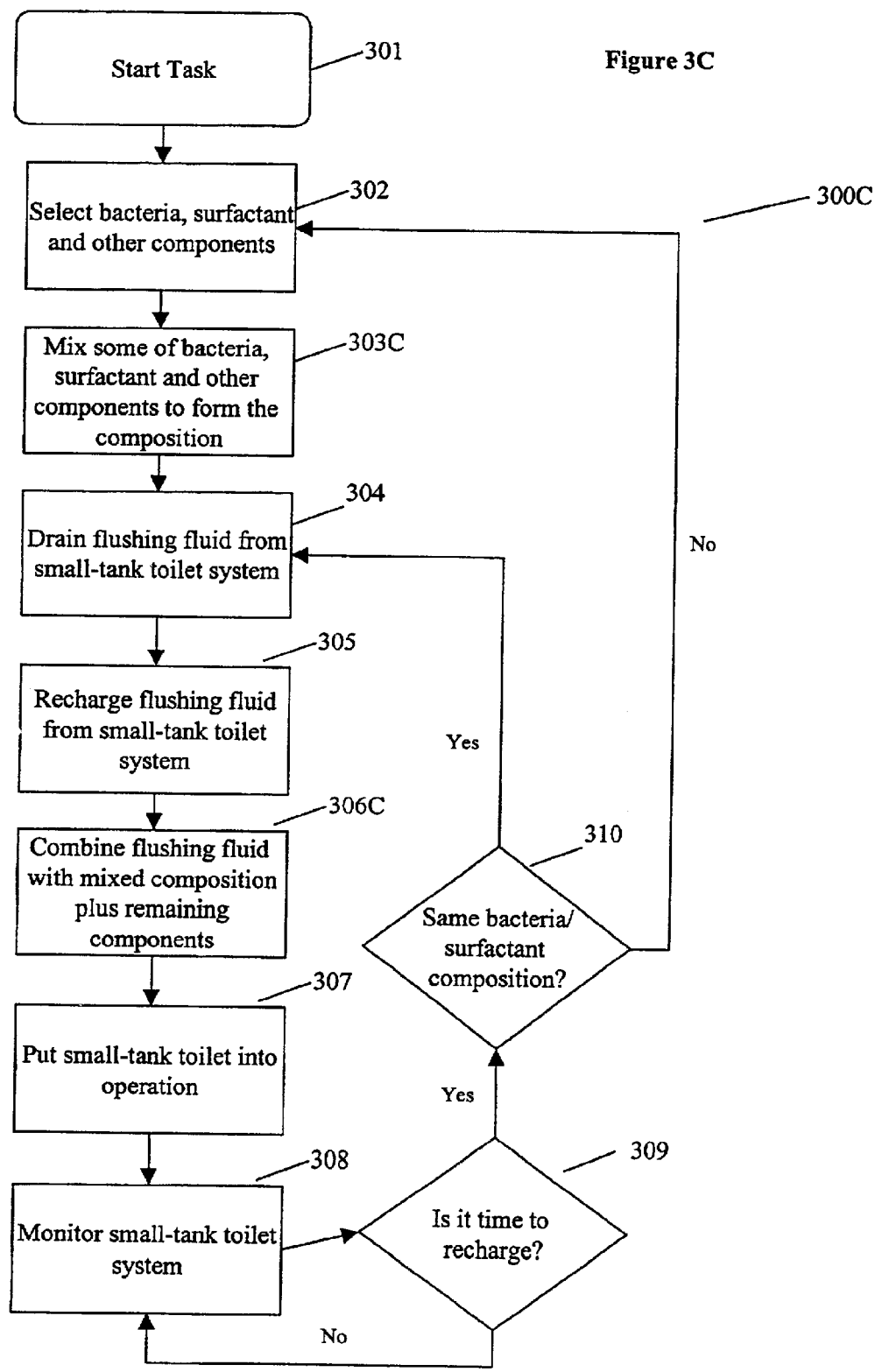
FIG. 3C illustrates, in block diagram, an second alternative embodiment of the method of the invention.

FIG. 3C illustrates, in block diagram, a second alternative embodiment of the method of the invention. The method in 300C too is the same as the method of 300A in FIG. 3A, except for steps 303 and 306. In method 300C, step 303 now is a mixing step in which some, but not all, of the bacteria, surfactant, and other components selected in step 302 are combined. In step 306C, the mixed components from step 303C and the remaining components are now combined in the flushing fluid. Again, while this process exhibits the advantages of the present invention, this process is believed to be less efficient and less reliable than the method of 300A.

Notably, each of these process importantly combines the bacteria, surfactant, and other components with each other and the flushing water.

The following examples will serve to illustrate the specific aspects of the present invention. The examples as well as other embodiments set forth in the specification are intended to be illustrative of the invention and shall not necessarily limit the scope thereof in any respect or be construed as such. Again, however, it will be obvious to those skilled in the art that the present invention may be practiced without such specific details. For the most part, details and the like have been omitted inasmuch as such details are not necessary to obtain a complete understanding of the present invention and are within the skills of persons of ordinary skill in the relevant art. Accordingly, while the preferred embodiments of the present invention and their advantages have been disclosed in the above detailed description, the invention is not limited thereto, but only by the spirit and scope of the appended claims.

In the examples and throughout the specification and claims, all parts and percentages are by weight unless otherwise expressly stated.

EXAMPLE 1

A powder form composition (total weight basis of 1000 grams) was mixed in the following proportions:

| Item | Sp. Gr. | Wt (%) | Wt (g) | Vol (ml) |
| --- | --- | --- | --- | --- |
| Calcium Carbonate | | 77.4 | 797 | |
| Dried Brewers Yeast | | 1.0 | 10 | |
| EDTA (Versene 200) | | 0.1 | 1 | |
| NP-9 | 1.062 | 5.8 | 60 | 56.5 |
| F-90 | | 5.8 | 60 | |
| Methyl Salicylate | 1.090 | 0.2 | 2 | 1.83 |
| DDBSA | | 2.9 | 30 | |
| BMET-1 | | 3.9 | 40 | |
| Tracer Blue | | 2.9 | 30 | |

All of the materials were blended together and placed inside a water-soluble pouch, such as the pouches made by Chris Craft, Gailbraiph, etc. This blend was found to have a good shelf life for use in small-tank toilet systems.

EXAMPLE 2

The powder form composition of Example 1 was tested over a three-day period with a single charge in a small-tank toilet system on a commuter train car of an American railroad passenger line. Before treatment, the tank was drained of its fluids and recharged with clean flushing fluid. The powder form composition was then added to the system by depositing the powder into the toilet bowl of the system and flushing the toilet. The toilet system was then operated under normal commuting conditions. Throughout the testing period, the flushing fluid and the toilet system were analyzed, which analysis reflected the collected materials were substantially eliminated and the odors of the collected materials were significantly diminished. Moreover, the color of the fluid remained a constant shade of blue throughout the test. When the flushing fluids were thereafter drained from the small-tank toilet system, the fluid was remarkably clearer and cleaner than the flushing fluids recovered from a standard small-tank toilet system.

EXAMPLE 3

A liquid form composition was mixed in the following proportions:

| Item | Wt (%) |
|---|---|
| Water | 64.65 |
| Isoproponol (99%) | 3.5 |
| Neodol 91-6 | 1.5 |
| Titan TC-777 | 4 |
| Sod. 2-ethylhexyl sulfate | 3.5 |
| EDTA (38%) | 1 |
| Monoethanolamine | 2.5 |
| DDBSA | 3.5 |
| Surfynol 104 | 0.05 |
| BMET-1 Conc. | 15.4 |
| Alpha-Blue | 0.5 |

All of the materials were blended together and placed inside a pouch for containing liquids. This blend was found to have a good shelf life for use in small-tank toilet systems. The liquid composition was tested in a small-tank toilet system and again received excellent results similar to the powder composition.

EXAMPLE 4

The liquid form composition of Example 3 was tested over a fourteen-day period with a single charge in a small-tank toilet system on a temporarily decommissioned train car of an American railroad passenger line. The purpose of this test was to evaluate an unusually long period of time for holding the flushing fluid and to view what happens internally in the toilet system. Fourteen days is a substantially longer period of holding time than generally used for small-tank toilet systems, without recharging.

Before treatment, the tank was drained of its flushing fluids. An optical camera was utilized to view the interior of the small tank prior to treatment. This view revealed a great deal of build up of accumulated grease materials throughout the small tank, especially on its walls.

The small tank was then charged with clean flushing fluid. The liquid form composition was added to the system by depositing the liquid into the toilet bowl and flushing the toilet. The toilet system was opened for use by the railway personnel. Throughout the fourteen-day testing period, the collected materials were substantially eliminated and the odor of the collected materials was significantly diminished. With respect to the color of the fluid, the blue fluid because greener and greener with exposure to the urine, which color change was viewed as aesthetically unacceptable.

When the flushing fluids were thereafter drained from the small-tank toilet system, once again the fluid was clearer and cleaner than fluids typically recovered from a standard small-tank toilet system. This was considered particularly remarkable given the long duration of the test.

The optical camera was then used to view the interior of the small tank. The small tank, including its walls, were now nearly completely free of the accumulated grease materials.

EXAMPLE 5

The composition of Example 3 was made except that the coloring agent used was Tracer-Blue RB-A80-00-100. The composition was then tested in a small-tank toilet system. The results were identical, except that the color was now consistent and acceptable for the application of the present invention.

What is claimed is:

1. A method for treating a tank toilet system comprising the steps of:
    (a) selecting a bacteria and a surfactant;
    (b) charging the tank toilet system with flushing liquid, wherein the tank toilet system is a recirculation tank toilet system and wherein the tank toilet system is selected from the group consisting of airplane toilet systems, bus toilet systems, and train toilet systems;
    (c) combining the bacteria, the surfactant, and the flushing liquid, wherein the bacteria is selected from the group consisting of *Bacillus licheniformis, Pseudomonas florescens, Alcaligenes latus, Bacillus subtilis*, and *Pseudomonas putida* and wherein the weight ratio of the bacteria and the surfactant (weight of the bacteria:weight of the surfactant) charged to the tank toilet system is from about 10% to about 50%.

2. The method of claim 1 wherein the weight ratio (weight of the bacteria:weight of the surfactant) is from about 10% to about 30%.

3. A method for treating a tank toilet system comprising the steps of:
    (a) selecting a bacteria and a surfactant;
    (b) charging the tank toilet system with flushing liquid; and
    (c) combining the bacteria, the surfactant, and the flushing liquid, wherein the bacteria is selected from the group consisting of *Bacillus licheniformis, Pseudomnonas florescens, Alcaligenes latus, Bacillus subtilis*, and *Pseudomonas putida* and wherein the tank toilet system,
        (i) is a recirculation tank toilet system, and
        (ii) is selected from the group consisting of airplane toilet systems, bus toilet systems, and train toilet systems.

4. A method for treating a tank toilet system comprising the steps of:
    (a) selecting a bacteria and a surfactant;
    (b) charging the tank toilet system with flushing liquid, wherein the tank toilet system is a recirculation tank toilet system and wherein the tank toilet system is selected from the group consisting of airplane toilet systems, bus toilet systems, and train toilet systems;
    (c) combining the bacteria, the surfactant, and the flushing liquid; and
    (d) mixing the bacteria and surfactant into a composition before combining it with the flushing liquid, wherein said composition is a form selected from the group consisting of a liquid form, a powder form, and a solid block-tablet form.

5. The method of claim 4 further comprising the steps of:
    (a) mixing a filler in the composition; and
    (b) mixing a food source in the composition.

6. The method of claim 5 further comprising the steps of:
    (a) mixing a deodorant in the composition; and
    (b) mixing a coloring agent in the composition, wherein the filler is selected from the group consisting of calcium carbonate and sodium sulfate and the food source is dried brewers yeast.

7. The method of claim 5 wherein:
    (a) the filler is mixed in the composition at least about 50% by weight;
    (b) the food source is mixed in a range from about 0.1% to about 5% by weight;

(c) a deodorant is mixed in the composition in a range from about 0.05% to about 2% by weight; and (d) the bacteria and the surfactant are mixed in the composition in the range from about 5% to about 50% by weight.

8. The method of claim 5 wherein:

(a) the filler is mixed in the composition with the range from about 50% to about 80% by weight;

(b) the food source is dried brewers yeast in the composition in the range from about 1% to about 2% by weight;

(c) a deodorant is mixed in the composition in a range from about 0.2% to about 1% by weight; and (d) the bacteria and the surfactant are mixed in the composition in the range of about 15% to about 20% by weight.

9. The method of claim 8 further comprising the step of combining a coloring agent with the bacteria and the surfactant, wherein the coloring agent is compatible with bacteria.

10. The method of claim 4 further comprising the steps of (a) mixing water in the composition;

(b) mixing an alcohol in the composition; and (c) wherein the form of the composition is the liquid form.

11. The method of claim 10 wherein:

(a) the water is mixed in the composition at least about 50% by weight;

(b) the alcohol is mixed with a monoethanolamine, the bacteria, and the surfactant in the range from about 1.5% to about 60% by weight of the alcohol, the monoethanolamine, bacteria, and surfactant;

(c) the monoethanolamine: is mixed with the alcohol, the bacteria, and the surfactant in the range from about 1.5% to about 60% by weight of the alcohol, the monoethanolamine, bacteria, and surfactant; and (d) the bacteria and the surfactant mixed with the alcohol and monoethanolamine in the range from about 20% to about 97% by weight of the alcohol, the monoethanolamine, bacteria, and surfactant.

12. The method of claim 11 wherein:

(a) the alcohol is mixed with a monoethanolamine, the bacteria, and the sufactant in the range from about 5% to about 20% by weight of the alcohol, the monoethanolamine, bacteria, and surfactant;

(b) the monoethanolamine is mixed with the alcohol, the bacteria, and the surfactant in the range from about 5% to about 15% by weight of the alcohol, the monoethanolamine, bacteria, and surfactant; and (c) the bacteria and the surfactant are mixed with the alcohol and monoethanolamine in the range from about 65% to about 90% by weight of the alcohol, the monoethanolamine, bacteria, and surfactant.

13. The method of claim 5 further comprising the step of combining a binding agent with the bacteria and the surfactant.

14. A method for treating a tank toilet system comprising the steps of:

(a) removing a first flushing liquid from a tank toilet system, wherein the tank toilet system is a recirculation tank toilet system and wherein the tank toilet system is selected from the group consisting of airplane toilet systems, bus toilet systems, and train toilet systems;

(b) charging the tank toilet system with a second flushing liquid;

(c) selecting a bacteria, which bacteria is selected from the group consisting of *Bacillus licheniformis, Pseudomonas florescens, Alcaligenes latus, Bacillus subtilis*, and *Pseudomonas putida*;

(d) selecting a surfactant for combining with the bacteria;

(e) charging the tank toilet system with the bacteria and the surfactant;

(f) repeating steps (a)–(e).

15. The method of claim 14 further comprising the steps of:

(a) combining a filler and a food source with the bacteria and the surfactant, wherein (i) the filler is calcium carbonate and is combined with the food source, the bacteria, and the surfactant in an amount of at least about 50% by weight;

(ii) the food source is dried brewers and is combined with the filler, the bacteria, and the surfactant in a range from about 0.1% to about 5% by weight; and (iii) the bacteria and the surfactant with the filler and the food source in a range from about 5% to about 50% by weight.

16. The method of claim 14 further comprising the steps of:

(a) combining water, alcohol, and monoethanolamine, with the bacteria and the surfactant, wherein (i) water is combined with the alcohol, the monoethanolamine, the bacteria, and the surfactant, by at least about 50% by weight;

(ii) the alcohol is combined with the monoethanolamine, the bacteria, and the surfactant in the range from about 1.5% to about 60% by weight of the alcohol, the monoethanolamine, bacteria, and surfactant;

(iii) the monoethanolamine is combined with the alcohol, the bacteria, and the surfactant in the range from about 1.5% to about 60% by weight of the alcohol, the monoethanolamine, bacteria, and surfactant; and (iv) the bacteria and the surfactant are combined with the alcohol and monoethanolamine in the range from about 20% to about 97% by weight of the alcohol, the monoethanolamine, bacteria, and surfactant.

17. An apparatus for treating human waste products comprising:

(a) a tank toilet system;

(b) a flushing liquid charged into the tank toilet system, wherein the tank toilet system is a recirculation tank toilet system and wherein the tank toilet system is selected from the group consisting of airplane toilet systems, bus toilet systems, and train toilet systems;

(c) a bacteria and a surfactant combined with the flushing liquid; and (d) a filler and a food source combined with the bacteria and the surfactant, wherein (i) the filler is calcium carbonate and is combined with the food source, the bacteria, and the surfactant in an amount of at least about 50% by weight;

(ii) the food source is dried brewers yeast and is combined with the filler, the bacteria, and the surfactant in a range from about 0.1% to about 5% by weight; and (iii) the bacteria and the surfactant with the filler and the food source in a range from about 5% to about 50% by weight.

18. An apparatus for treating human waste products comprising:
  (a) a tank toilet system;
  (b) a flushing liquid charged into the tank toilet system, wherein the tank toilet system is a recirculation tank toilet system and wherein the tank toilet system is selected from the group consisting of airplane toilet systems, bus toilet systems, and train toilet systems;
  (c) a bacteria and a surfactant combined with the flushing liquid; and
  (d) water, alcohol, and monoethanolamine, combined with the bacteria, and the surfactant, wherein
    (i) water is combined with the alcohol, the monoethanolamine, the bacteria, and the surfactant, by at least about 50% by weight;
    (ii) the alcohol is combined with the monoethanolamine, the bacteria, and the surfactant in the range from about 1.5% to about 60% by weight of the alcohol, the monoethanolamine, bacteria, and surfactant;
    (iii) the monoethanolamine is combined with the alcohol, the bacteria, and the surfactant in the range from about 1.5% to about 60% by weight of the alcohol, the monoethanolamine, bacteria, and surfactant; and
    (iv) the bacteria and the surfactant are combined with the alcohol and monoethanolamine in the range from about 20% to about 97% by weight of the alcohol, the monoethanolamine, bacteria, and surfactant.

19. An apparatus for treating human waste products comprising:
  (a) a tank toilet system, wherein the tank toilet system is selected from the group consisting of airplane toilet systems, bus toilet systems, and train toilet systems; and
  (b) a flushing liquid charged into the tank toilet system, wherein the tank toilet system is a recirculation tank toilet system;
  (c) a bacteria charged into the tank toilet system for decomposing human waste product in the tank toilet system to form byproduct; and
  (d) a surfactant charged into the tank toilet system, wherein the bacteria and surfactant are combined with the flushing liquid in an amount capable of neutralizing the byproduct odor.

20. A method for treating a tank toilet system comprising the steps of:
  (a) selecting a bacteria and a surfactant;
  (b) charging the tank toilet system with flushing liquid, wherein the tank-toilet system is a recirculation tank toilet system and wherein the tank toilet system is selected from the group consisting of airplane toilet systems, bus toilet systems, and train toilet systems; and
  (c) combining the bacteria, the surfactant, and the flushing liquid.

21. A method for treating a tank toilet system comprising the steps of:
  (a) selecting a bacteria and a surfactant;
  (b) charging the tank toilet system with a flushing liquid, wherein the tank toilet system is a recirculation tank toilet system, wherein the tank toilet system is selected from the group consisting of airplane toilet systems, bus toilet systems, and train toilet systems
  (c) combining the bacteria and the surfactant with the flushing liquid;
  (d) monitoring the tank system to determine when the flushing liquid should be removed and determining that the flushing fluid should be removed;
  (e) removing the flushing liquid in response to the determining step; and
  (f) repeating steps (a)–(e).

22. The method of claim 21 wherein the monitoring step comprises inspecting the level of liquid in the tank toilet system.

23. The method of claim 21 wherein the monitoring step comprises monitoring a time duration since the charging step.

24. The method of claim 23 wherein the time duration is at most three days.

25. The method of claim 21 wherein the monitoring step is based upon the number of airplane, bus, or train trips, respectively.

* * * * *